(12) United States Patent
Chen

(10) Patent No.: US 6,402,501 B1
(45) Date of Patent: Jun. 11, 2002

(54) MOLD HAVING SEPARATE HEATING AND COOLING DEVICES

(76) Inventor: Shia Chung Chen, 11F, No. 14, Lane 236, Sec. 1, Jung Gin Road, Taoyuan City, Taoyuan (TW), 330

( * ) Notice: Subject to any disclaimer, the term of this patent is extended or adjusted under 35 U.S.C. 154(b) by 0 days.

(21) Appl. No.: 09/751,068

(22) Filed: Jan. 2, 2001

(51) Int. Cl.$^7$ ................................................. B29C 45/73

(52) U.S. Cl. ........................................ 425/548; 425/552

(58) Field of Search ................................ 425/547, 548, 425/552

(56) References Cited

U.S. PATENT DOCUMENTS 5,338,172 A * 8/1994 Williamson et al. ........ 425/143

* cited by examiner

Primary Examiner—Tim Heitbrink
(74) Attorney, Agent, or Firm—Charles E. Baxley

(57) ABSTRACT

A mold device includes two mold pieces having a mold cavity for receiving a material to be treated, a heating member for heating the mold pieces, and a cooling casing selectively movable to engage with the mold pieces and to cool the material received in the mold pieces after the material has been heated and formed by the heating member. The heating of the mold pieces by the heating member thus will not be affected by the cooling casing. The heating member is received in one of the mold pieces piece. The casing has a conduit for receiving the cooling media.

5 Claims, 4 Drawing Sheets

MOLD HAVING SEPARATE HEATING AND COOLING DEVICES

BACKGROUND OF THE INVENTION

1. Field of the Invention

The present invention relates to a mold assembly, and more particularly to a mold assembly having separate heating and cooling devices.

2. Description of the Prior Art

As shown in FIGS. 1 and 2, the typical mold assemblies includes two mold pieces 1, 2 each having a mold cavity 3, 4 formed therein for receiving the materials, such as the plastic or the other synthetic materials, in order to form the products according to the shapes of the mold cavities 3, 4 of the mold pieces 1, 2, when the mold pieces 1, 2 are moved or forced toward each other. The mold piece 2 includes a passage 5 formed therein and communicating with the mold cavity 4 thereof for injecting or inserting the materials into the mold cavity 4 of the mold piece 2. The other mold piece 1 includes a heating member 6 and a cooling member, such as a cooling tube 7 provided therein for heating and for cooling the materials received in the mold pieces 1, 2 respectively. The cooling water or the other cooling media is continuously supplied through the cooling tube 7 for cooling the mold piece 1 and the material received in the mold cavities 3, 4 of the mold pieces 1, 2 even when the heating member 6 is energized. The heating effect of the heating member 6 to the material received in the mold cavities 3, 4 of the mold pieces 1, 2 may thus be greatly decreased.

The present invention has arisen to mitigate and/or obviate the afore-described disadvantages of the conventional mold assemblies.

SUMMARY OF THE INVENTION

The primary objective of the present invention is to provide a mold assembly including separate heating and cooling devices for cooling the materials received in the mold pieces after the materials have been heated and formed.

In accordance with one aspect of the invention, there is provided a mold assembly comprising a first mold piece and a second mold piece including a mold cavity formed therein for receiving a material to be treated, means for heating the first and the second mold pieces, a cooling casing, and means for moving the cooling casing to engage with the first and the second mold pieces and to cool the material received in the mold cavity of the first and the second mold pieces, after the material is heated by the heating means. The heating of the mold pieces by the heating means will not be affected by the cooling casing.

The heating means includes a heating member engaged in the second mold piece. The second mold piece includes a chamber formed therein, and a block received in the chamber thereof, the heating member is received in the block.

A device may further be provided and used for moving the second mold piece to engage with the first mold piece. The cooling casing includes a cooling member engaged therein for receiving cooling media therein.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
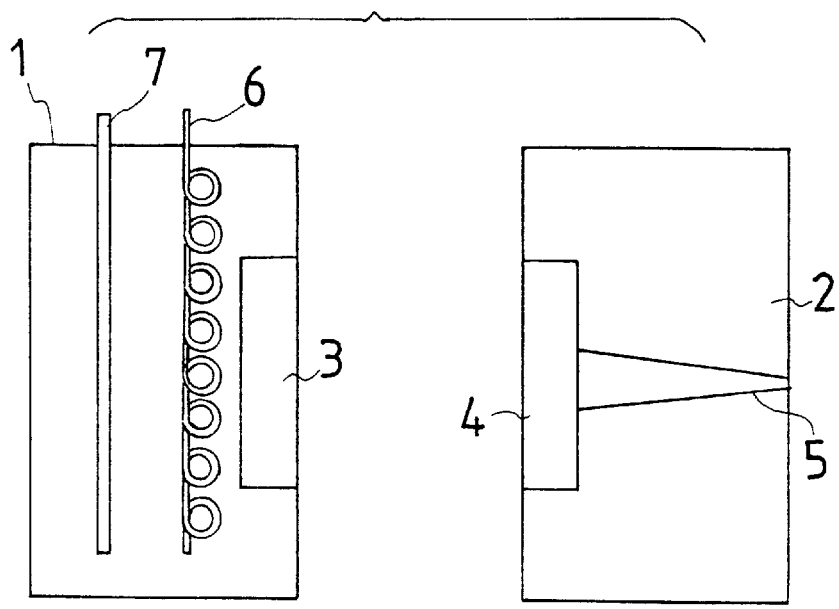
FIG. 1 is a plane and exploded schematic view of a typical mold device.
Figure 2:
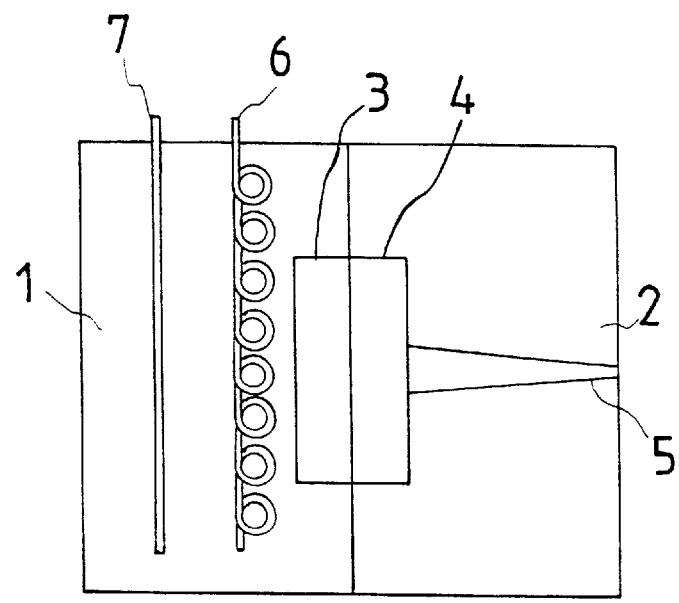
FIG. 2 is a plane schematic view of the typical mold device.
Figure 5:
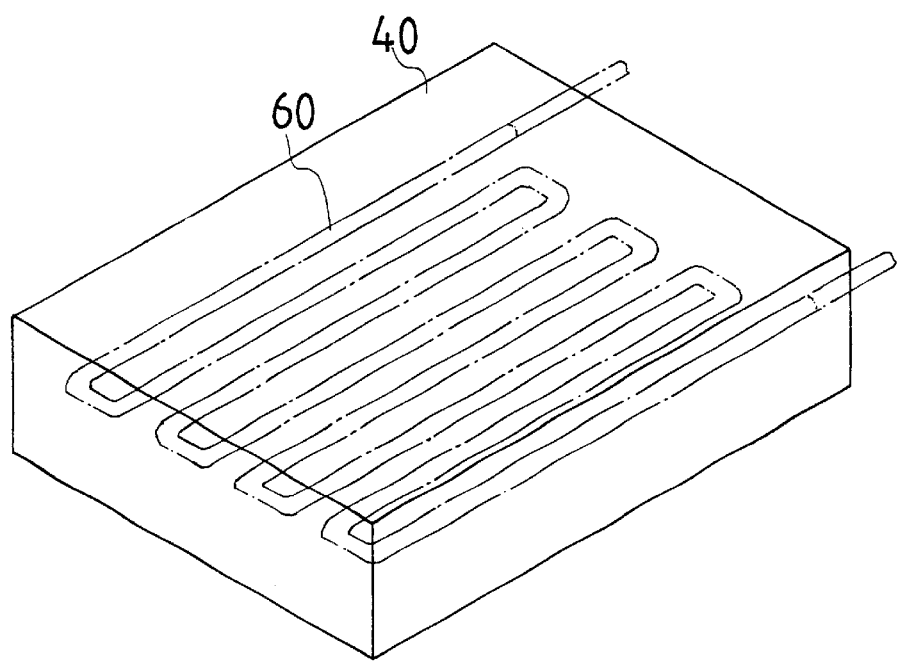
FIG. 5 is a partial perspective view showing a casing for cooling purposes for the mold assembly.
Figure 3:
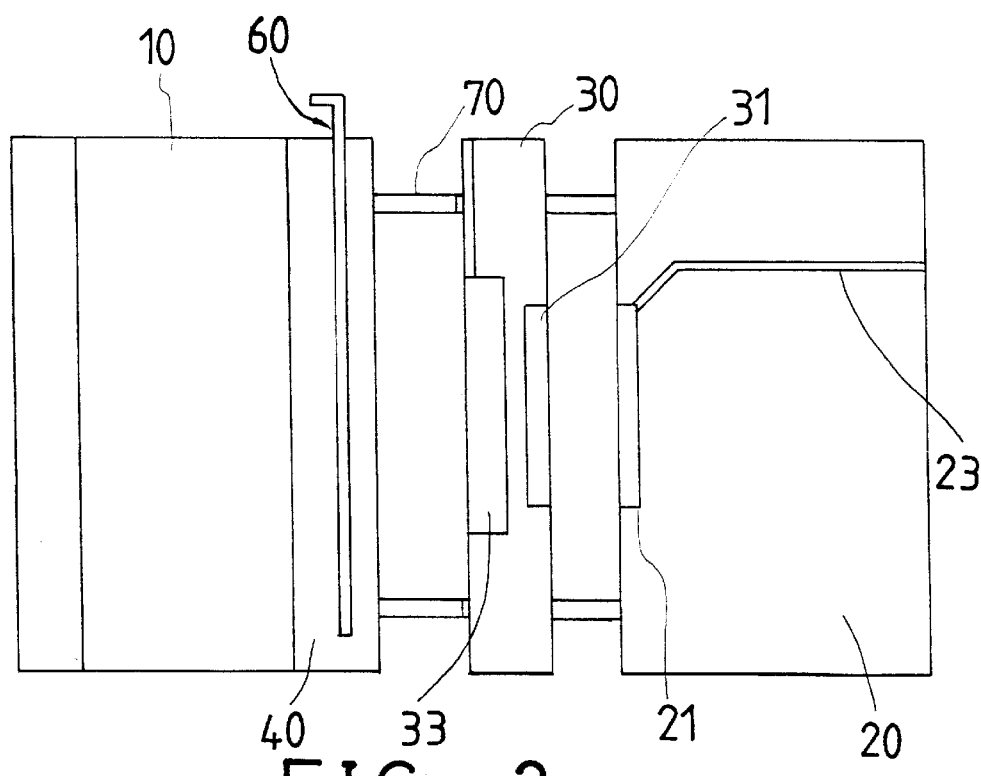
FIG. 3 is a plane schematic view of a mold assembly in accordance with the present invention.

Referring to the drawings, and initially to FIG. 3, a mold assembly in accordance with the present invention comprises two mold pieces 20, 30 each having a mold cavity 21, 31 formed therein for receiving the materials, such as the plastic or the other synthetic materials, in order to form the products according to the shapes of the mold cavities 21, 31 of the mold pieces 20, 30, by such as the typical molding or mold injection processes. The mold piece 20 includes a passage 23 formed therein and communicating with the mold cavity 21 thereof for injecting or inserting the materials into the mold cavity 21 of the mold piece 20.

Figure 4:
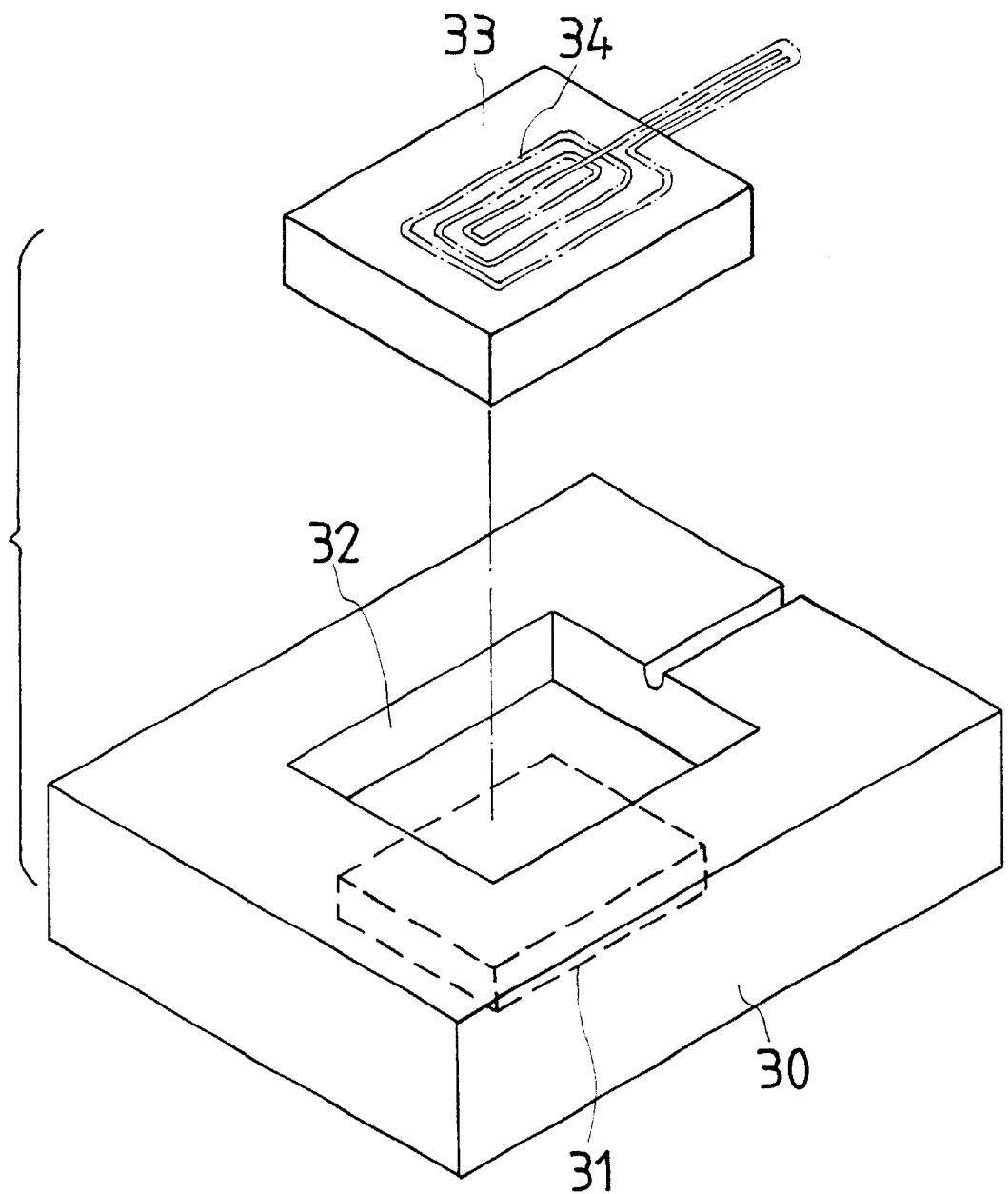
FIG. 4 is a partial exploded view of a mold piece of the mold assembly.
Figure 6:
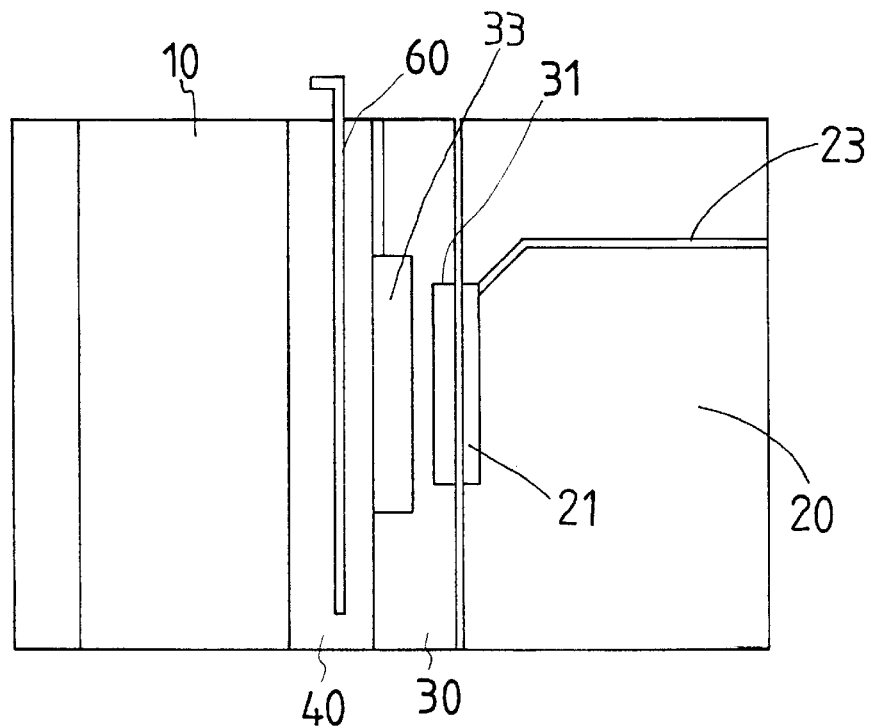
FIGS. 6 and 7 are plane schematic views similar to FIG. 3, illustrating the operation of the mold assembly in accordance with the present invention.
Figure 7:
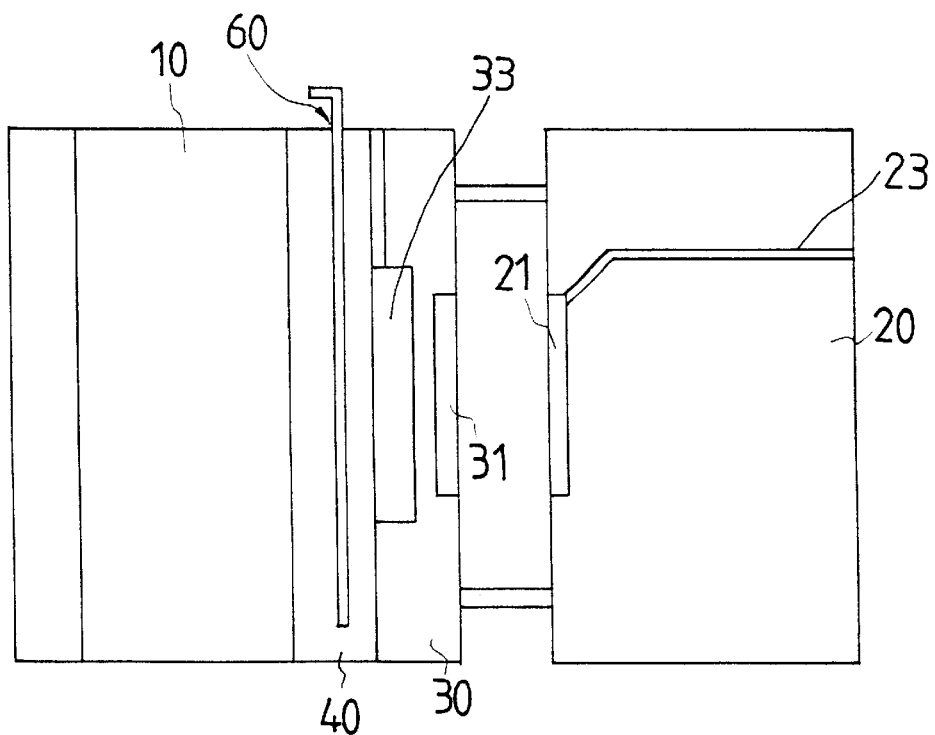

As shown in FIG. 4, the other mold piece 30 includes a chamber 32 formed therein, such as opposite to the mold cavity 31 thereof. A block 33 is received in the chamber 32 of the mold piece 30 and includes a heating member 34 which may be used for heating the block 33 and thus the mold pieces 30, 20 and thus for heating the materials received in the mold cavities 21, 31 of the mold pieces 20, 30, in order to form the products according to the shapes of the mold cavities 21, 31 of the mold pieces 20, 30, when the mold pieces 20, 30 are moved or forced toward each other. The block 33 may also be formed as an integral portion of the mold piece 30, and the heating member 34 may also be directly provided in the mold piece 30.

The mold assembly further includes a casing 40 having a cooling member 60, such as a cooling tube or a cooling conduit (60) provided or formed therein for receiving the cooling water or the other cooling media and for cooling the casing 40 and the mold pieces 20, 30 and thus for cooling the materials received in the mold pieces 20, 30 after the materials received in the mold cavities 21, 31 of the mold pieces 20, 30 have been heated and formed into the required shape. The mold assembly further includes a housing 10, and includes one or more actuators, such as the hydraulic or pneumatic cylinders received in the housing 10, and having piston rods 70 for forcing the mold piece 30 toward and to engage with the mold piece 20, and one or more further actuators having piston rods 70 for forcing the casing 40 toward and to engage with the mold piece 30.

In operation, as shown in FIG. 3, the mold piece 30 may be forced toward and to engage with the mold piece 20 by the piston rods 70 of the actuators. The materials may then be inserted or injected or engaged into the mold cavities 21, 31 of the mold pieces 20, 30. The heating member 34 may then be used to heat the mold pieces 30, 20 and thus the materials received in the mold cavities 21, 31 of the mold pieces 20, 30, in order to form the required products.

After the materials received in the mold cavities 21, 31 of the mold pieces 20, 30 have been heated and formed into the required shape, the casing 40 is then moved toward and to engage with the mold piece 30. The cooling media flowing through the cooling member 34 may thus be used to cool the casing 40 and the mold pieces 20, 30 in order to cool the materials received in the mold cavities 21, 31 of the mold pieces 20, 30, and so as to form the required products.

The mold pieces 20, 30 may thus be heated by the heating member 34 received in the mold piece 30 when the casing 40 and the cooling member 60 are disengaged or separated from the mold pieces 20, 30. The heating effect of the heating member 34 to the mold pieces 20. 30 thus will not be affected by the cooling member 60. The mold cavities 21, 31 may be formed in either one of the mold pieces 20, 30 instead of being formed in both of the mold pieces 20, 30.

Accordingly, the mold assembly in accordance with the present invention includes separate heating and cooling devices for cooling the materials received in the mold pieces after the materials have been heated and formed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mold assembly comprising:

a first mold piece and a second mold piece including a mold cavity formed therein for receiving a material to be treated, means for heating said first and said second mold pieces, a cooling casing, and means for moving said cooling casing to engage with said first and said second mold pieces and to cool the material received in said mold cavity of said first and said second mold pieces, after the material is heated by said heating means.

2. The mold assembly according to claim 1, wherein said heating means includes a heating member engaged in said second mold piece.

3. The mold assembly according to claim 2, wherein said second mold piece includes a chamber formed therein, and a block received in said chamber thereof, said heating member is received in said block.

4. The mold assembly according to claim 1 further comprising means for moving said second mold piece to engage with said first mold piece.

5. The mold assembly according to claim 1, wherein said cooling casing includes a cooling member engaged therein for receiving cooling media therein.

\* \* \* \* \*